Figure 1:
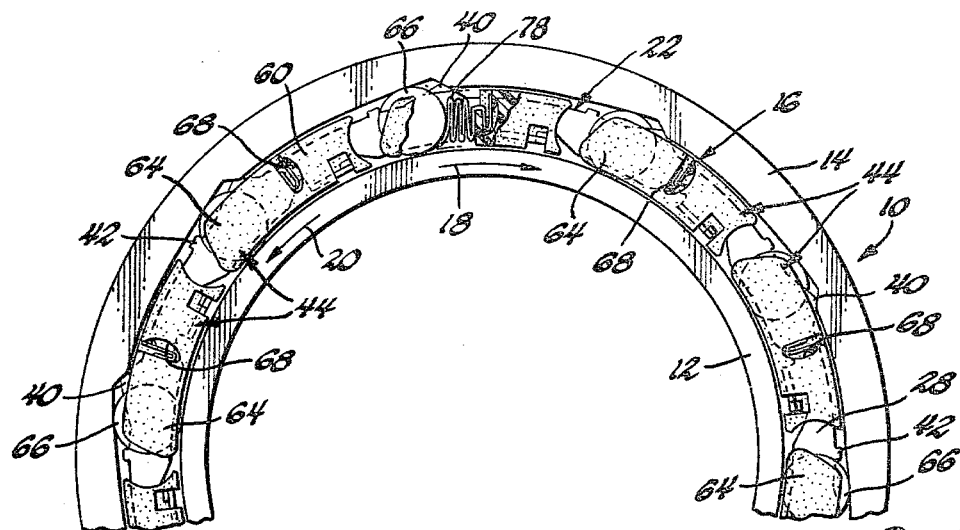

United States Patent [19]

Kitchin

[11] 4,187,937
[45] Feb. 12, 1980

[54] UNIT HANDLED ROLLER CLUTCH SUBASSEMBLY

[75] Inventor: Oscar G. Kitchin, Port Clinton, Ohio

[73] Assignee: General Motors Corporation, Detroit, Mich.

[21] Appl. No.: 929,327

[22] Filed: Jul. 31, 1978

[51] Int. Cl.² ............................................. F16D 41/06
[52] U.S. Cl. ................................................... 192/45
[58] Field of Search ................. 192/45; 308/217; 188/82, 84

[56] References Cited

U.S. PATENT DOCUMENTS

| 3,547,238 | 12/1970 | Harmon | 192/45 |
|---|---|---|---|
| 3,732,956 | 5/1973 | Johnson et al. | 192/45 |
| 3,902,580 | 9/1975 | Johnson | 192/45 |
| 3,917,036 | 11/1975 | Johnson et al. | 192/45 |
| 3,927,744 | 12/1975 | Hallerburg | 192/45 |
| 4,054,192 | 10/1977 | Johnson | 192/45 |
| 4,088,211 | 5/1978 | Doller et al. | 192/45 |
| 4,106,602 | 8/1978 | Dieckermann | 192/45 |

Primary Examiner—Ronald Feldbaum
Attorney, Agent, or Firm—F. J. Fodale

[57] ABSTRACT

An overrunning roller clutch is provided with a stamped and bent sheet metal cage which carries a number of molded bearing blocks. The bearing blocks center the clutch races with respect to each other and also cooperate in providing a unit handled subassembly of caged rollers for the clutch.

3 Claims, 5 Drawing Figures

U.S. Patent  Feb. 12, 1980  4,187,937

UNIT HANDLED ROLLER CLUTCH SUBASSEMBLY

This invention relates generally to overrunning roller clutches and more particularly to a unit handled roller clutch subassembly of the type which includes a cage and bearing blocks such as disclosed in the U.S. Pat. application Ser. No. 783,420 filed by John S. Doller and Oscar G. Kitchin on Mar. 31, 1977 now U.S. Pat. No. 4,088,211 for an "Overrunning Roller Clutch with Improved Cage and Bearing Block."

The unit handled roller clutch subassembly disclosed in the aforementioned patent application while suitable for many purposes has a limited load capacity. This is because the cage has a separate spring retention tab for a tickler spring associated with each roller which limits the number of rollers that can be fit into the annular space between the races.

It is broadly the object of this invention to generally improve upon the unit handled roller clutch subassembly disclosed in the aforementioned patent application by decreasing the circumferential space requirements for each roller and thereby allowing a greater number of rollers and increased load capacity for the subassembly.

Another object of this invention is to provide a unit handled roller clutch subassembly having bearing blocks provided with means for mounting the tickler springs thereby eliminating the need for a separate tab and reducing the annular space requirements for each roller and its associated components.

Another object of this invention is to provide a unit handled roller clutch subassembly in which bearing blocks incorporating means for mounting the tickler springs are securely retained on the cage in a simple and efficient manner.

Still another object of this invention is to provide a unit handled roller clutch subassembly having means securely retaining the bearing blocks on the cage which are of reduced circumferential dimension to compensate for the space requirements of the tickler spring mounting means incorporated in the bearing blocks.

Still yet another object of the invention is to provide a unit handled roller clutch subassembly having a cage which requires only one cantilevered tab for each roller thereby simplifying cage manufacture and assembly.

Figure 2:
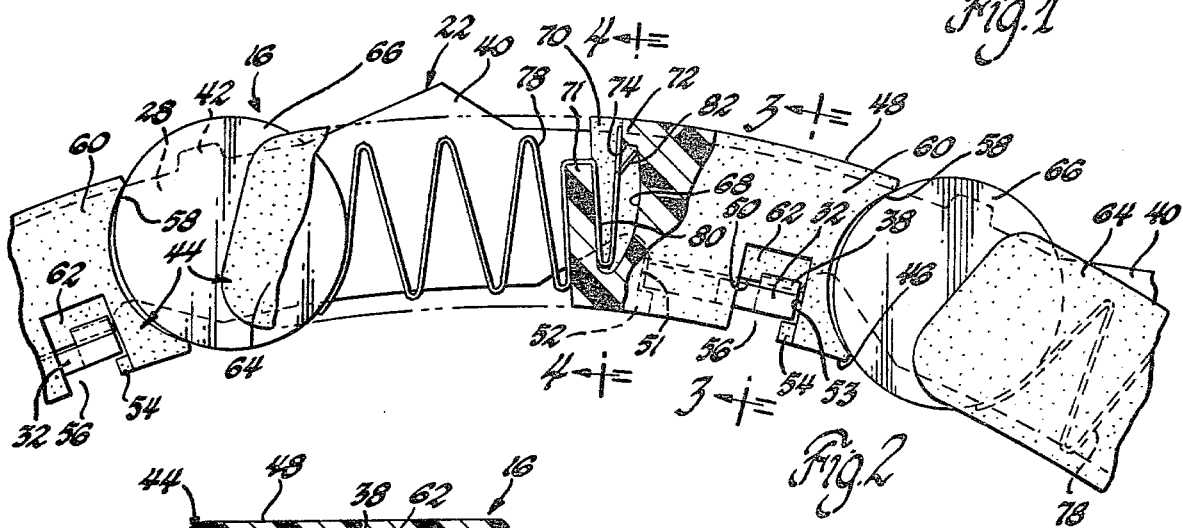
Figure 3:
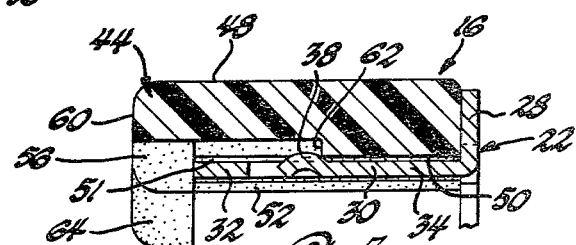
Figure 4:
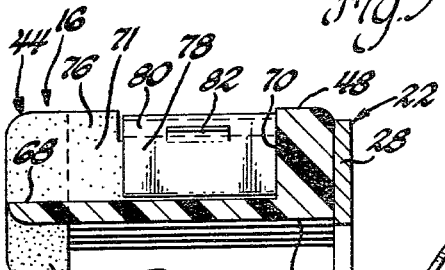
Figure 5:
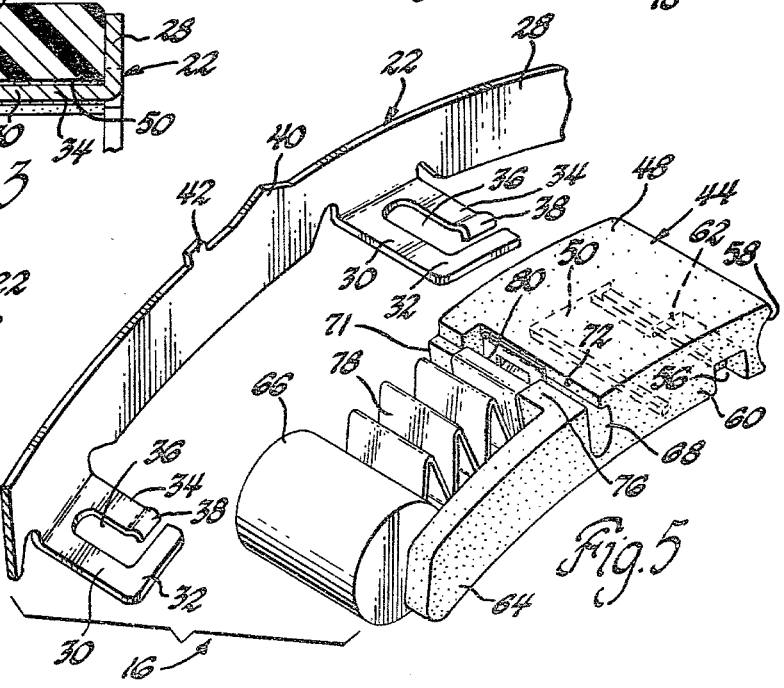

Other objects and features of the invention will become apparent to those skilled in the art as the disclosure is made in the following detailed description of a preferred embodiment of the invention as illustrated in the accompanying sheet of drawing in which:

FIG. 1 is a fragmentary front view of an overrunning roller clutch having an improved unit handled roller clutch subassembly in accordance with this invention, FIG. 2 is an enlarged partially sectioned view of a portion of the improved subassembly shown in FIG. 1, FIG. 3 is a section taken substantially along the line 3—3 of FIG. 2, FIG. 4 is a section taken substantially along the line 4—4 of FIG. 2, and FIG. 5 is an exploded perspective view of the subassembly portion shown in FIG. 2.

Referring now to the drawing and more particularly to FIG. 1, this invention is concerned with an overrunning roller clutch indicated generally at 10 comprising an inner race 12 and an outer race 14 having a unit handled roller clutch subassembly indicated generally at 16 therebetween. The roller clutch subassembly 16 cooperates with the races 12 and 14 to permit the races to rotate relative to one another in one direction while locking the races together in response to relative rotation in the opposite direction. For instance, in the clutch 10 illustrated in FIG. 1, the inner race 12 is freely rotatable in the clockwise direction relative to the race 14 as indicated by the arrow 18. On the other hand, relative rotation in the opposite direction indicated by the arrow 20 is prevented by the rollers locking the races together.

The subassembly 16 includes a one-piece cage 22 generally annular in form and fabricated from sheet metal by stamping and bending operations. The cage 22 comprises a single end ring portion 28 and a plurality of circumferentially spaced tab portions 30 which are integrally connected to the inner margin of the end ring portion 28 by perpendicular bends so as to extend in cantilevered fashion therefrom in the axial direction.

The tab portions 30 (as best illustrated in FIG. 5) each have an L-shaped support arm 32 and cantilevered retention finger 34 having its free end remote from the end ring portion 28. The finger 34 is separated from the L-shaped support arm 32 by an L-shaped slot 36 and the free end is bent to provide a curved latch 38 of part cylindrical shape. The end ring portion 28 has conventional reaction ears 40 and is also provided with lugs 42 which ensure proper assembly of the subassembly 16 between the races 12 and 14.

The subassemly 16 also includes molded plastic bearing blocks 44 of a low friction material such as nylon. The bearing blocks 44 have inner and outer concentric bearing surfaces 46 and 48 which center the outer race 14 on the inner race 12. These bearing blocks 44 each have an axial, circumferentially oriented slot 50 which extends from the back side of the bearing block. The slot 50 has narrow side portions 51 and 53 defined by lower ledges 52 and 54 and has a through portion 56 which extends completely through the bearing block 44 adjacent an end of the bearing block having a concave roller retention surface 58. The through portion 56 is enlarged partway back from the front side 60 to provide a latch shoulder 62. The bearing block 44 has a circumferential extension 64 at the front side 59 which extends from the end of the bearing block opposite the concave roller retention surface 58. The circumferential extension 64 is axially spaced from the end ring portion 28 of the cage 22 and together with the end ring portion 28 serves to retain the roller 66 in the axial direction.

The bearing block 44 has a radial slot 68 which extends axially from the front side 60 to an abutment wall 70 near the back side of the bearing block and defines an end wall 71. The slot 68 is open at the outer bearing surface 48 where a ledge 72 provides an internal retention shoulder 74. A spring locating lug 76 is provided at the corner of the end wall 71 and the extension 64.

The bearing blocks 44 are assembled to the cage 22 simply by inserting the tab portions 30 into the slots 50 until the curved latches 38 snap into engagement with the latch shoulders 62. Once latched, the bearing blocks 44 are secured in the radial and circumferential direction by the fit of the outside edge of the L-shaped support arm 32 in the narrow side portion 51 and the fit of the outside edge of the retention finger 34 and the tip of the L-shaped support arm 32 in the narrow side portion 53. It should be noted that the circumferential space requirements of this tab and slot arrangement is reduced in comparison to the aforementioned patent application permitting incorporation of the radial slot 68 in about the same length. After the bearing blocks 44 are assembled, the accordion shaped tickler springs 78 may then be mounted on the end walls 71 simply by inserting part of the clip portions 80 radially into the slots 68 until the latch fingers 82 engage the shoulders 74 where the clip portions 80 are centered by the abutment walls 70 and the lugs 76. Alternatively the tickler springs 78 could be mounted on the bearing blocks 44 first and then bearing blocks 44 assembled to the cage 22. In either event, the rollers 66 are then assembled in the pockets formed by the end ring 28 and bearing block extensions 64 where the rollers 66 are biased by the springs 78 against the concave roller retention surfaces 58 of adjacent bearing blocks. Axial retention of the rollers 66 is provided by the end ring portion 28 and the bearing block extensions 64 which as shown in FIG. 2 are spaced from an adjacent bearing block less than a roller diameter.

When the unit handled roller clutch subassembly 16 is combined with the races 12 and 14 as shown in FIG. 1, the rollers 66 are backed off the bearing blocks 44 by the profile of the outer race 12. In this operating position the ends of the rollers 66 are nearly covered by the bearing block extensions 64. This provides a very good arrangement for retaining the rollers 66 axially and preventing roller skewing during operation.

I wish it to be understood that I do not desire to be limited to the exact details of construction shown and described, for obvious modifications will occur to a person skilled in the art.

What is claimed is:

1. In a unit handled roller clutch subassembly having a sheet metal cage with a single end ring portion and a plurality of circumferentially spaced, integral tab portions extending in cantilevered fashion therefrom in an axial direction, a plurality of bearing blocks of low friction material having inner and outer bearing surfaces mounted on respective tab portions for centering inner and outer clutch races with respect to each other, each of said bearing blocks having a circumferential slot receiving an associated tab portion for securement to the cage and a circumferential extension spaced from the end ring portion for retaining a roller in the axial direction, the improvement comprising:
    each of said bearing blocks having a second slot for mounting a tickler spring to engage a roller and urge it toward an adjacent bearing block.

2. In a unit handled roller clutch subassembly having a sheet metal cage with a single end ring portion and a plurality of circumferentially spaced, integral tab portions extending in cantilevered fashion therefrom in an axial direction, a plurality of bearing blocks of low friction material having inner and outer bearing surfaces mounted on respective tab portions for centering inner and outer clutch races with respect to each other, each of said bearing blocks having a circumferential slot receiving an associated tab portion for securement to the cage and a circumferential extension spaced from the end ring portion for retaining a roller in the axial direction, the improvement comprising:
    each of said tab portions having a bearing block mounted thereon, and
    each of said bearing blocks having a radial slot open at one radial end for mounting a tickler spring to engage a roller and urge it toward an adjacent bearing block, said radial slot being adjacent an end of the bearing block having the circumferential extension.

3. In a unit handled roller clutch subassembly having a sheet metal cage with a single end ring portion and a plurality of circumferentially spaced, integral tab portions extending in cantilevered fashion therefrom in an axial direction, a plurality of bearing blocks of low friction material having inner and outer bearing surfaces mounted on respective tab portions for centering inner and outer clutch races with respect to each other, each of said bearing blocks having a circumferential slot receiving an associated tab portion for securement to the cage and a circumferential extension spaced from the end ring portion for retaining a roller in the axial direction, the improvement comprising:
    each of said tab portions having a support arm and a retention finger having an outside edge portion disposed in narrow side portions of the associated circumferential slot, and
    each of said bearing blocks having a radial slot open at one radial end for mounting a tickler spring to engage a roller and urge it toward an adjacent bearing block, said radial slot being adjacent an end of the bearing block having the circumferential extension and said circumferential extension being spaced from the adjacent bearing block by less than a roller diameter.

* * * * *